United States Patent
Thielhorn et al.

(10) Patent No.: US 11,407,150 B2
(45) Date of Patent: Aug. 9, 2022

(54) TRIM COMPONENT FOR VEHICLE INTERIOR

(71) Applicant: Shanghai Yanfeng Jinqiao Automotive Trim Systems Co., Ltd., Plymouth, MI (US)

(72) Inventors: Peter Thielhorn, Mulheim an der Ruhr (DE); Werner Klusmeier, Lubbecke (DE); Hubert Brueckner, Erkrath (DE)

(73) Assignee: SHANGHAI YANFENG JINQIAO AUTOMOTIVE TRIM SYSTEMS CO. LTD., Novi, MI (US)

( * ) Notice: Subject to any disclaimer, the term of this patent is extended or adjusted under 35 U.S.C. 154(b) by 1501 days.

(21) Appl. No.: 15/247,476

(22) Filed: Aug. 25, 2016

(65) Prior Publication Data
US 2017/0043514 A1    Feb. 16, 2017

Related U.S. Application Data

(63) Continuation-in-part of application No. PCT/EP2015/053475, filed on Feb. 19, 2015.

(30) Foreign Application Priority Data

Feb. 26, 2014    (DE) .................. 102014002564A1

(51) Int. Cl.
*B29C 44/14* (2006.01)
*B60R 13/02* (2006.01)
(Continued)

(52) U.S. Cl.
CPC ........ *B29C 44/145* (2013.01); *B29C 44/1233* (2013.01); *B29C 44/146* (2013.01);
(Continued)

(58) Field of Classification Search
CPC . B29C 44/12; B29C 44/1228; B29C 44/1233; B29C 44/1238; B29C 44/1271
See application file for complete search history.

(56) References Cited

U.S. PATENT DOCUMENTS

| 4,247,348 A | 1/1981 | Lischer |
| 4,758,294 A | 7/1988 | Storch |

(Continued)

FOREIGN PATENT DOCUMENTS

| DE | 3701560 C1 | 4/1988 |
| DE | 3838145 C1 | 4/1990 |

(Continued)

OTHER PUBLICATIONS

IPRP dated Jun. 20, 2016 for PCT/EP2015/053475.
(Continued)

*Primary Examiner* — Atul P. Khare
(74) *Attorney, Agent, or Firm* — Amin, Turocy & Watson, LLP

(57) ABSTRACT

A trim component for vehicle interior is disclosed. A method for forming the trim component is also disclosed. The trim component comprises a cover material, a base layer, a foamed plastic, and a support element. The base layer is intended to prevent foamed plastic from penetrating into the pores of the cover material. Foamed plastic is injected between the base layer and the support element to form the trim component. The method comprises the steps of producing a base layer, applying and fixing at least part of the cover material to the base layer to form a pre-laminate, introducing the pre-laminate into a foaming mold with the base layer between the cover material and a foam chamber (between the pre-laminate and the support element) within a foaming mold and introducing foamed plastic into the foam chamber to form the trim component.

20 Claims, 13 Drawing Sheets

(51) Int. Cl.
*B29C 44/12* (2006.01)
*B29L 31/58* (2006.01)
*B29L 31/30* (2006.01)

(52) U.S. Cl.
CPC ....... *B60R 13/02* (2013.01); *B29L 2031/3041* (2013.01); *B29L 2031/58* (2013.01)

(56) References Cited

U.S. PATENT DOCUMENTS

| | | | |
|---|---|---|---|
| 5,133,912 A | | 7/1992 | Hagiwara et al. |
| 5,743,979 A | | 4/1998 | Lorbiecki |
| 5,744,776 A | | 4/1998 | Bauer |
| 5,885,662 A | * | 3/1999 | Gardner, Jr. ............ B29C 41/22 427/426 |
| 6,120,630 A | | 9/2000 | Lorbiecki |
| 6,254,122 B1 | | 7/2001 | Wu |
| 7,033,660 B2 | * | 4/2006 | Cowelchuk ......... B29C 45/0053 264/241 |
| 7,087,199 B2 | * | 8/2006 | Delcros ............... B29C 44/1257 264/46.4 |
| 7,100,941 B2 | | 9/2006 | Riha |
| 7,361,293 B2 | * | 4/2008 | Wolff ................. B29C 44/1257 264/46.5 |
| 7,556,284 B2 | | 7/2009 | Riho |
| 7,638,197 B2 | * | 12/2009 | Haas ....................... B32B 27/40 428/423.1 |
| 7,678,305 B2 | * | 3/2010 | Grabowski ........... B29C 44/141 264/46.4 |
| 8,458,905 B2 | * | 6/2013 | Fox ............................ B32B 5/18 29/897.2 |
| 8,507,074 B2 | * | 8/2013 | Katou ................. B29C 44/1238 428/189 |
| 2004/0089965 A1 | * | 5/2004 | Malfliet ................ B29C 44/582 264/46.6 |
| 2004/0134588 A1 | * | 7/2004 | Gerken ................. B29C 44/582 156/78 |
| 2005/0276874 A1 | | 12/2005 | Menaldo et al. |
| 2006/0157881 A1 | | 7/2006 | GraboWwsskki |
| 2010/0059170 A1 | | 3/2010 | Muller et al. |
| 2010/0264698 A1 | | 10/2010 | Stachura et al. |
| 2013/0004702 A1 | | 1/2013 | Schaefer et al. |
| 2017/0043514 A1 | | 2/2017 | Thielhorn |

FOREIGN PATENT DOCUMENTS

| | | |
|---|---|---|
| DE | 4226377 A1 | 2/1993 |
| DE | 9305017 | 11/1993 |
| DE | 9305017 U1 | 11/1993 |
| DE | 19546397 A1 | 6/1997 |
| DE | 19801651 A1 | 7/1999 |
| DE | 102011016914 B4 | 3/2015 |
| DE | 102011112164 B4 | 5/2018 |
| EP | 0336138 | 10/1989 |
| EP | 0337183 A2 | 10/1989 |
| EP | 0387230 A1 | 3/1990 |
| EP | 0337183 B1 | 6/1992 |
| EP | 3107704 B1 | 3/2021 |
| FR | 2887193 A1 | 12/2006 |
| WO | 2006/101959 | 9/2006 |
| WO | 2012104103 A1 | 8/2012 |

OTHER PUBLICATIONS

International Search Report dated May 28, 2015 for PCT/EP2015/053475.
International Preliminary Examination Report dated May 6, 2016 for PCT/EP2015/053475.
International Preliminary Examination Report dated Mar. 7, 2016 for PCT/EP2015/053475.
Office Action for Chinese Application No. 201580020542.8, 8 pages.
Notification to Grant Patent Right for Invention for Chinese Application No. 201580020542.8, 2 pages.
European Search Report for European Patent Application No. 14AI031-US dated Feb. 16, 2021, 6 pages.

* cited by examiner

TRIM COMPONENT FOR VEHICLE INTERIOR

CROSS REFERENCE TO RELATED APPLICATIONS

The present application is a continuation-in-part of International Application No. PCT/EP15/053475 titled "MULTI-LAYERED SHAPED BODY FOR INTERNAL VEHICLE FITTINGS AND METHOD FOR PRODUCING SUCH SHAPED BODIES" filed Feb. 19, 2015.

The present application claims priority from and the benefit of and incorporates by reference in entirety of the following applications: (a) International Application No. PCT/EP15/053475 titled "MULTI-LAYERED SHAPED BODY FOR INTERNAL VEHICLE FITTINGS AND METHOD FOR PRODUCING SUCH SHAPED BODIES" filed Feb. 19, 2015; (b) German Patent Application No. DE 102014002564A1 titled "MEHRSCHICHTIGER FORMKÖRPER FÜR FAHRZEUGINNENAUSSTATTUNGEN SOWIE VERFAHREN ZUR HERSTELLUNG SOLCHER FORMKÖRPER (A MULTI-LAYER MOLDED BODY FOR VEHICLE INTERIORS, AS WELL AS METHODS FOR PRODUCING SUCH MOLDED ARTICLES)" filed Feb. 26, 2014.

FIELD

The present invention relates to a trim component for a vehicle interior.

BACKGROUND

It is known to provide a trim component for vehicle interior. It is also known to provide a cover material for the trim component. It is also known for the cover material to be made from leather and/or imitation leather. It is further known that different kinds of cover materials are produced on different mold apparatus.

It would be advantageous to provide an improved method for forming a trim component. It would also be advantageous to form the trim component within one mold apparatus. It would further be advantageous to form the different trim components characterized by different cover materials within the same mold apparatus.

SUMMARY

The present invention relates to a method for producing a trim component for a vehicle interior comprising a cover material on a base layer provided in a shape and backed with a foam material in an apparatus comprising a tool. The method comprises the steps of providing the base layer in the shape, placing the cover material onto the base layer so that the cover material is provided substantially in the form of the base layer, introducing foam into the tool to form a formed component comprising the cover material with base layer and the foam material and removing the formed component from the tool. The base layer may comprise at least one of a barrier layer, a foil and/or a film. The cover material may comprise at least one segment; each segment of the cover material may be combined onto the base layer; each segment of the cover material may be combined to form the shape. The cover material may be at least one of pre-fixed to the base layer and/or attached to the base layer. The cover material may be at least one of selectively attached to the base layer and/or placed on the base layer and secured by a tape. The cover material may be at least one of leather and/or imitation leather. The apparatus may comprise an injection mold and a heating system. The cover material may be secured to the base layer by at least one of heat, heat from the heating system and/or pressure. The foam material may be formed by an exothermic reaction generating heat in the tool. The base layer may be configured to be substantially impermeable to at least one of the foam and/or the foam material. The cover material may be secured to the base layer by an adhesive that is activated to attach to the base layer during at least one of when the cover material is placed onto the base layer and when the formed component is formed; the cover material may be secured to the base layer and the base layer is bonded to the foam material.

The present invention also relates to a trim component. The method comprises the steps of providing a base layer in a shape, placing a cover material onto the base layer so that the cover material is provided substantially in the shape of the base layer, placing the cover material and the base layer in a tool, introducing foam into the tool to form a formed component comprising the cover material with base layer and a foam material and removing the formed component from the tool. The base layer may comprise at least one of a barrier layer, a foil and/or a film. The cover material may comprise at least one segment; each segment of the cover material may be combined onto the base layer; each segment of the cover material may be combined to form the shape. The cover material is at least one of pre-fixed to the base layer, attached to the base layer, selectively attached to the base layer and/or placed on the base layer and secured by a tape. The cover material is at least one of leather and/or imitation leather; the foam material is formed by an exothermic reaction generating heat in the tool. The tool may comprise an injection mold and a heating system. The cover material may be secured to the base layer by an adhesive that is activated to attach to the base layer during at least one of when the cover material is placed onto the base layer and when the formed component is formed; and wherein the cover material is secured to the base layer by at least one of heat and/or pressure.

The present invention also relates to a method for producing a trim component for a vehicle interior comprising a cover material backed with a plastic by injection molding in an apparatus comprising a tool. The method comprises the steps of providing a base layer in a shape, placing the cover material onto the base layer so that the cover material is provided substantially in the shape of the base layer, introducing plastic into the tool to form a formed component comprising the cover material with the base layer and a plastic material and removing the formed component from the tool. The cover material may comprise segments of at least one of leather or imitation leather. The segments of the cover material may be configured to be combined to form the shape; the formed component may have the shape; the cover material (with base layer) may be provided on a support element.

The present invention further relates to a method for producing multilayer molded bodies, particularly interior fittings for motor vehicles, in which a foamed plastic is applied to a reverse side of a cover material. The method comprises the steps of producing a self-supporting barrier layer which is impervious to the foamed plastic, applying and fixing at least part of the reverse side of the cover material to the self-supporting barrier layer (such that a pre-laminate is formed between the barrier layer and the cover material), introducing the pre-laminate of barrier layer and cover material into a foaming mold (such that the barrier layer is arranged between the cover material and a foam chamber of the foaming mold) and introducing foamed plastic into the foam chamber of the foaming mold. The barrier layer may be produced in a form which substantially corresponds to the outer contour of the molded body to be manufactured; the barrier layer may be formed from a thermally thermoformed film; the barrier layer may be formed from a foamed plastic, preferably of polyolefin or polystyrene (PET, PE, PP, PS). The barrier layer may be formed so as to be self-adhesive such that said barrier layer joins to the cover material during the thermoforming process; the fixation between the barrier layer and the cover material may be effected by at least one adhesive layer. The self-supporting barrier layer may be at least partially coated with the adhesive layer prior to the pre-laminate being produced. An adhesive layer which may be activatable above a predefinable activation temperature is used as the adhesive layer; the activatable adhesive layer has an activation temperature which corresponds to a reaction temperature of the foamed plastic. The cover material may comprise at least one joining and/or decorative seam; the cover material may be fixed to the barrier layer exclusively along the joining/decorative seam. At least one seam blade and/or optical sensors is/are used to position the joining/decorative seam on the barrier layer. Genuine leather and/or imitation leather may be used as the cover material. The foamed plastic may be formed from a $CO_2$-driven molded polyurethane foam. A multilayer molded body, particularly an interior fitting for a motor vehicle, may comprise at least one cover material fixed to a foamed plastic.

FIGURES

DESCRIPTION

Figure 1A:
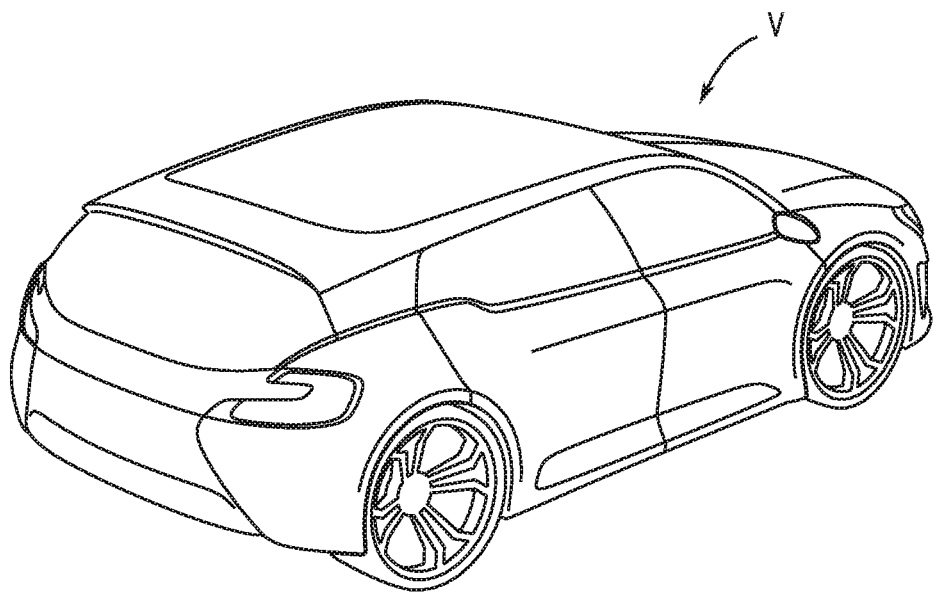
FIG. 1A is a schematic perspective view of a vehicle according to an exemplary embodiment.
Figure 1B:
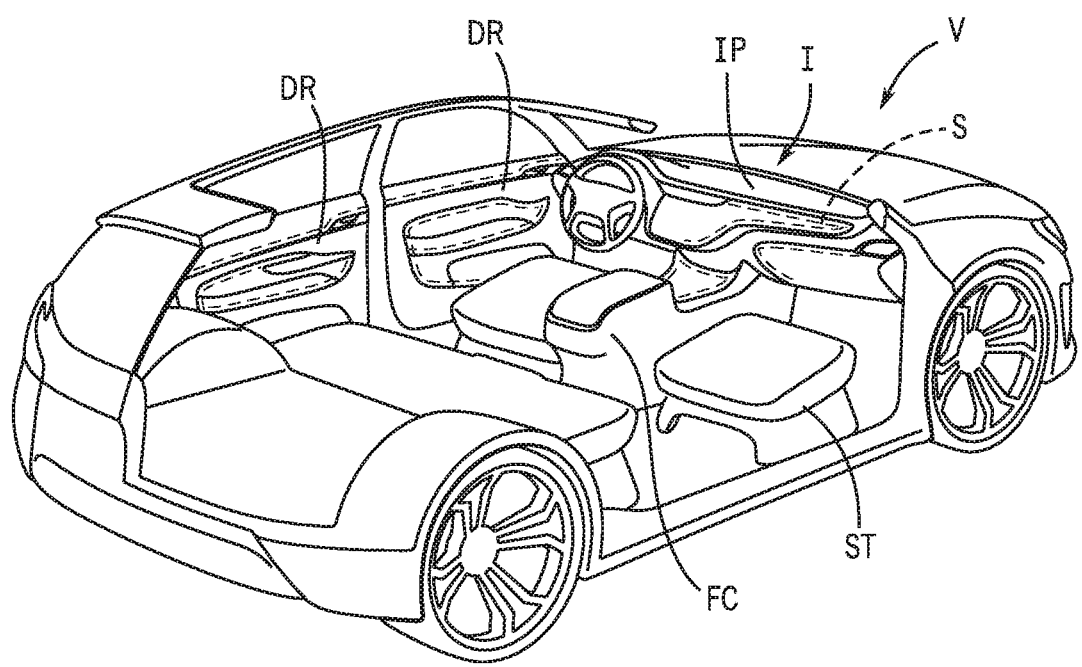
FIG. 1B is a schematic perspective cut-away view of a vehicle showing a vehicle interior according to an exemplary embodiment.
Figure 1C:
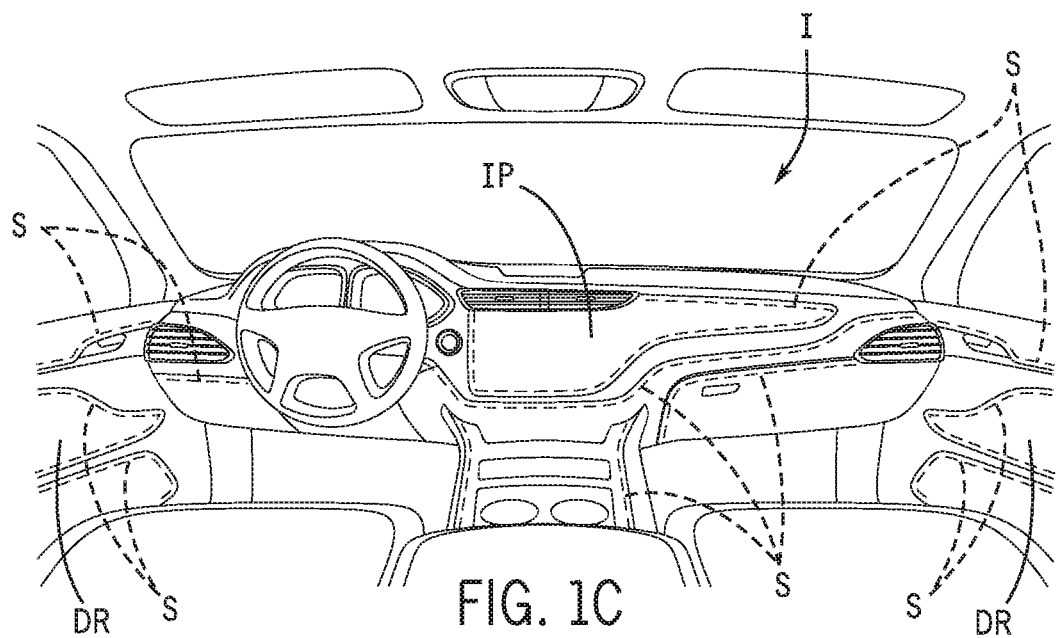
FIG. 1C is a schematic perspective view of the vehicle interior according to an exemplary embodiment.

Referring to FIGS. 1A, 1B and 1C, a vehicle V is shown including an interior I with instrument panel IP and floor console FC; vehicle also provides doors DR and seats ST. Interior components of the vehicle V such as instrument panel IP, floor console FC, doors DR, and seats ST may include components such as panels made from plastic materials (e.g. plastics, thermoplastics components, foamed thermoplastic parts, etc.). According to an exemplary embodiment, components may include panels such as trim panels comprising a base or substrate of a plastic material (e.g. structure) and a cover material (e.g. such as leather, imitation leather, film, PVC, etc.) to provide a visible exterior surface.

Figure 2A:
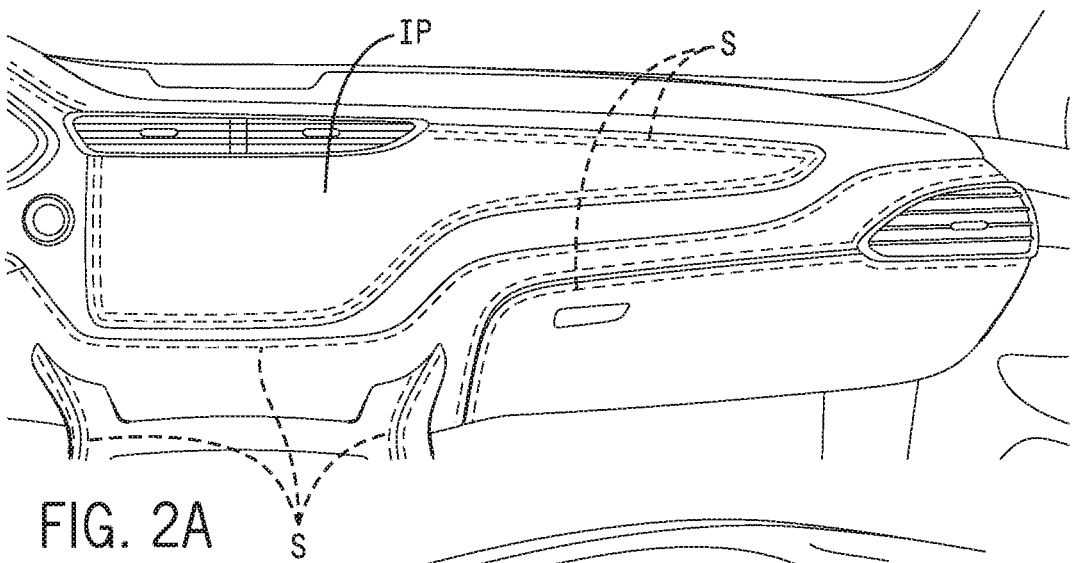
FIGS. 2A and 2B are schematic perspective detail views of the vehicle interior according to an exemplary embodiment.
Figure 2B:
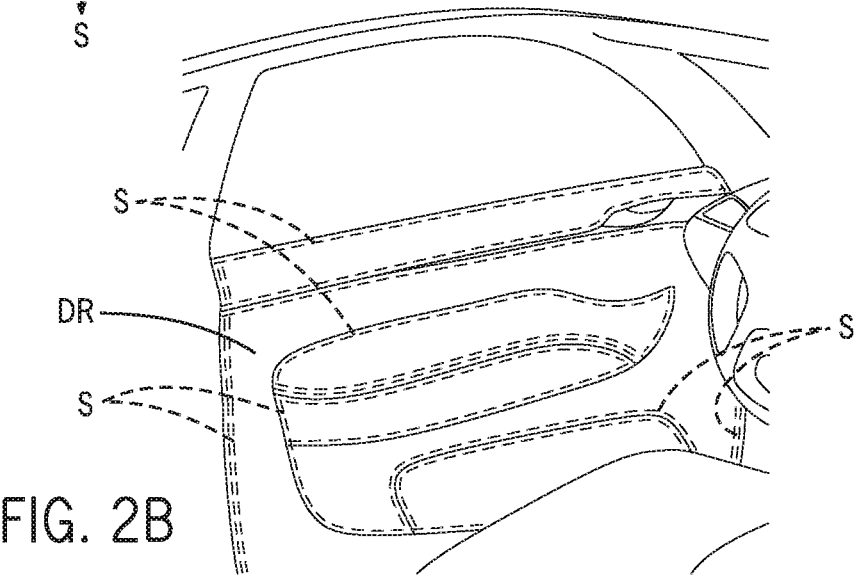

As shown schematically according to an exemplary embodiment in FIGS. 1C, 2A and 2B, components such as trim panels may comprise a base and cover material shown as a cover layer with seam/stitching S. Interior components or trim parts may provide visible surfaces in the vehicle. See FIGS. 1B, 1C, 2A and 2B. As shown schematically in FIGS. 2A and 2B according to an exemplary embodiment, seam S provided on a trim panel may provide a visual appearance or effect (as well as other mechanical effects).

As shown schematically in FIGS. 2A and 2B, the vehicle trim component may be provided in a form configured to provide cushioning at various sections; according to an exemplary embodiment, the visual characteristics of the trim component (e.g. color, form, etc.) as well as texture or feel may be provided by selected materials (e.g. leather, PVC, etc.). As shown schematically in FIGS. 2A and 2B, the trim component may be configured to display seams/stitches S to provide an intended visual effect.

Figure 3A:
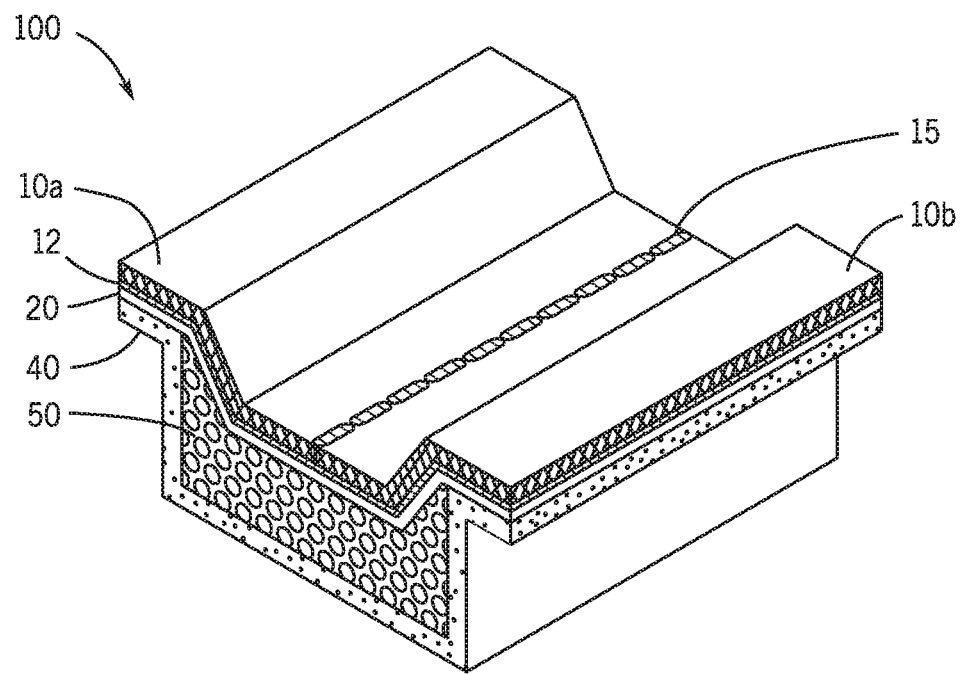
FIG. 3A is a schematic perspective view of a trim component for the vehicle interior according to an exemplary embodiment.
Figure 3B:
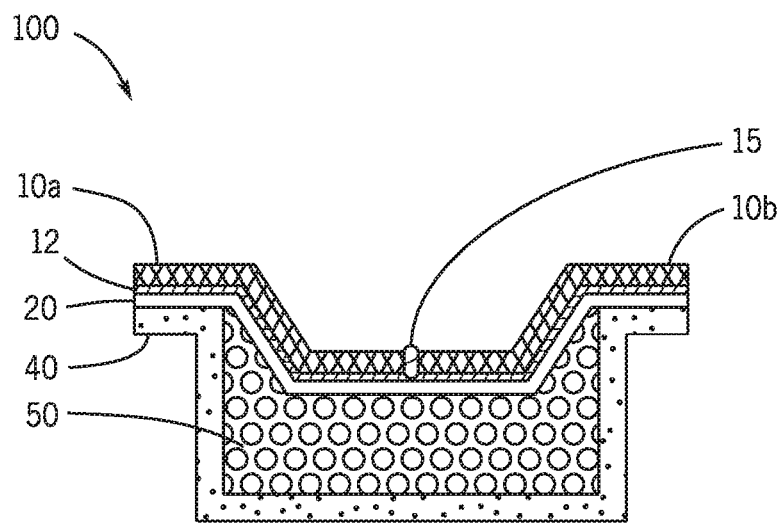
FIG. 3B is a schematic cross-section view of the trim component according to an exemplary embodiment.

As shown schematically in FIGS. 3A and 3B according to an exemplary embodiment, a trim component 100 comprises a cover material 10, a base layer 20, a supporting element shown as a substrate 40, and a foam material 50 between base layer 20 and substrate 40. As shown schematically in FIGS. 3A and 3B according to an exemplary embodiment, cover material 10 is combined to base layer 20 by an adhesive layer 12; cover material 10 comprises two segments (i.e. segment 10a and segment 10b); segment 10a and segment 10b are combined by or at a seam 15. See FIGS. 3A and 3B. According to an exemplary embodiment, the cover material may comprise at least one segment of cover material; each segment of the cover material maybe combined to form a shape (e.g. with at least one seam); according to an exemplary embodiment, the cover material may be made from leather and/or imitation/artificial leather; the cover material may also provide seams (e.g. decorative, mechanical, etc.) on the cover material.

According to an exemplary embodiment, the formed component may comprise a shape (e.g. three-dimensional form) provided (e.g. maintained) by the plastic material molded behind the base layer (e.g. provided in a two-dimensional form) and cover material. As indicated schematically according to an exemplary embodiment, cover material and base layer are combined into a shape or form (e.g. three-dimensional form as a substrate or pre-laminate section).

Figure 4A:
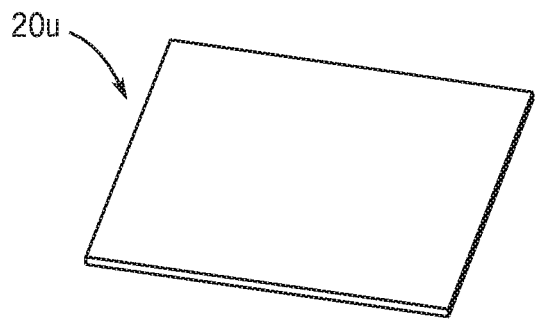
FIG. 4A is a schematic perspective view of a base layer according to an exemplary embodiment.

As shown schematically in FIG. 4A, a base layer 20u is in a two-dimensional form (e.g. unfinished or unprocessed).

Figure 4B:
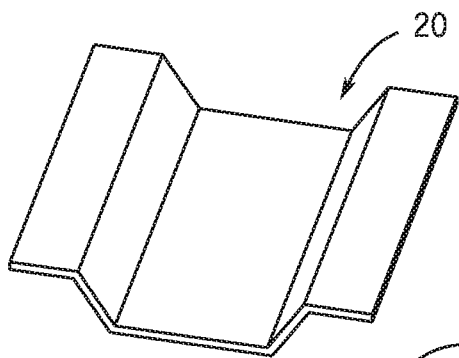
FIG. 4B is a schematic perspective view of the base layer formed into the shape of the outer contour of a trim component according to an exemplary embodiment.

As shown schematically in FIG. 4B, base layer 20 is formed (from base layer 20u) to a three-dimensional shape which corresponds to the shape or form (e.g. provided by three-dimensional contour or outer contour) of the finished trim component.

Figure 4C:
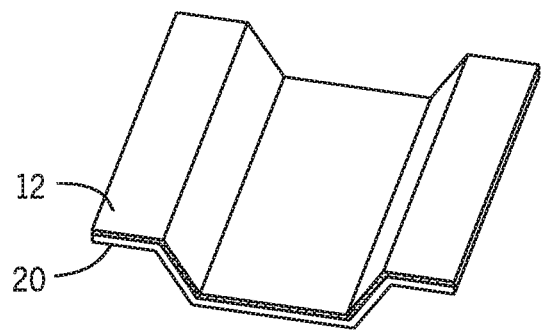
FIG. 4C is a schematic perspective view of the base layer with an adhesive layer according to an exemplary embodiment.

As shown schematically in FIG. 4C, adhesive shown as adhesive layer 12 is applied on the outer surface of base layer 20.

Figure 4D:
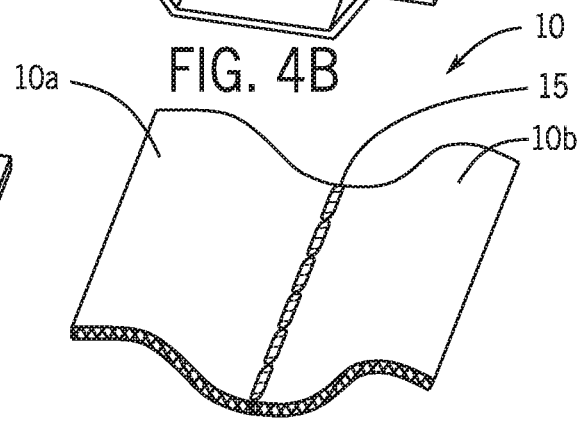
FIG. 4D is a schematic perspective view of a cover material being applied to the base layer according to an exemplary embodiment.

As shown schematically in FIG. 4D, the cover material 10 is pre-fixed to base layer 20 to form the pre-laminate section.

Figure 4E:
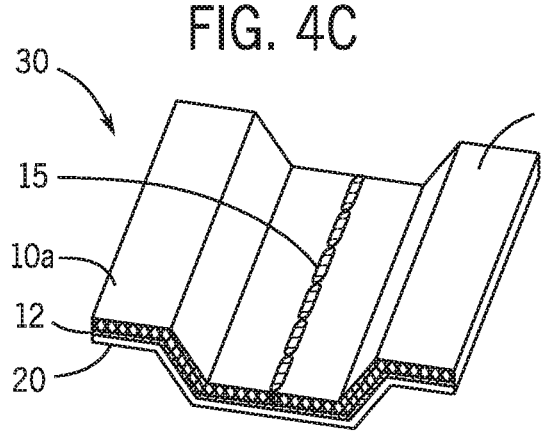
FIG. 4E is a schematic perspective view of a pre-laminate comprising the cover material and the base layer according to an exemplary embodiment.
Figure 4F:
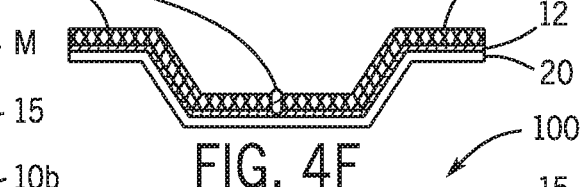
FIG. 4F is a schematic cross-section view of the pre-laminate according to an exemplary embodiment.

As shown schematically in FIGS. 4E and 4F, a pre-laminate base or section shown as pre-laminate 30 is formed; pre-laminate 30 comprises cover material 10 and base layer 20; cover material 10 is attached to base layer 20 by adhesive of adhesive layer 12. According to an exemplary embodiment, cover material 10 is attached (e.g. lightly bonded, pre-fixed, etc.) to the base layer by adhesive. According to an exemplary embodiment, material 10 may selectively be detached from base layer 20 and re-attached to base layer 20 (e.g. if mis-applied).

Figure 4G:
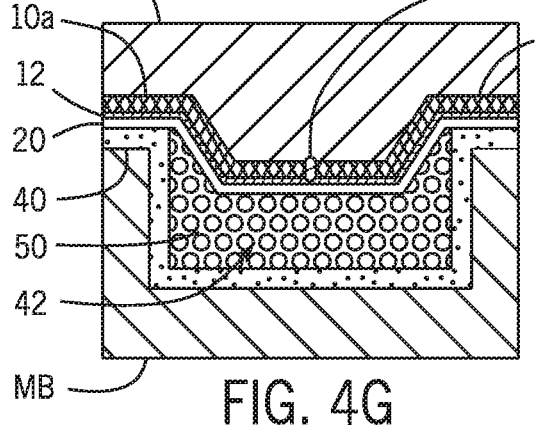
FIG. 4G is a schematic cross-section view of a foaming tool forming the trim component according to an exemplary embodiment.

As shown schematically in FIG. 4G, the apparatus or tool shown as mold M comprises a mold top MT and a mold bottom MB; mold M is in a closed position. Substrate 40 is placed in a recess of mold bottom MB; pre-laminate 30 is placed on top of substrate 40; a cavity shown as foaming chamber 42 is provided between base layer 20 and substrate 40. According to an exemplary embodiment, a foam material 50 is injected into foaming chamber 42 by an inlet/part such as a nozzle (e.g. flow channel on the side of the tool). According to an exemplary embodiment, mold M may provide a heat exchanger such as a heating element to control (e.g. increase) the temperature of mold M. According to an exemplary embodiment, foam material 50 may be created by introduction of materials that create a chemical reaction within mold M (e.g. multi-component foam reaction according to known conventional methods or similar future methods); the chemical reaction to form foam material 50 may be exothermic (e.g. generating heat). According to an exemplary embodiment, the temperature in the mold (e.g. from heating element in mold M and from the reaction to foam material 50 will be configured to reach a temperature that corresponds to the activation temperature of adhesive 12; according to an exemplary embodiment, adhesive or adhesive layer 12 when activated at the activation temperature within mold M will bond cover material 10 to base layer 20. According to an exemplary embodiment, base layer 20 comprises a barrier layer impervious to foam material; base layer or barrier layer is intended to protect cover material 10 from damage by the foam material during the foaming process.

Figure 4H:
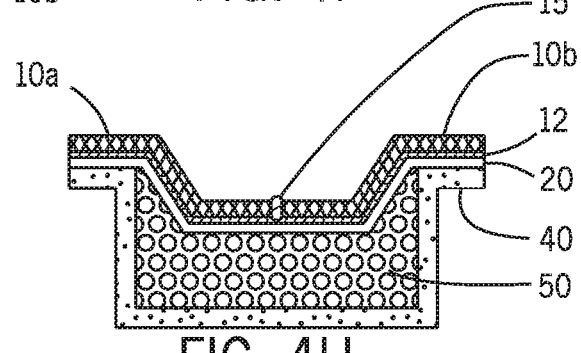
FIG. 4H is a schematic cross-section view of the trim component according to an exemplary embodiment.

According to an exemplary embodiment, trim component 100 is shown schematically in FIG. 4H; trim component 100 comprises cover material 10 bonded to base layer 20 by adhesive layer 12, substrate 40 and foam material 50. See also FIGS. 3A and 3B.

Figure 5A:
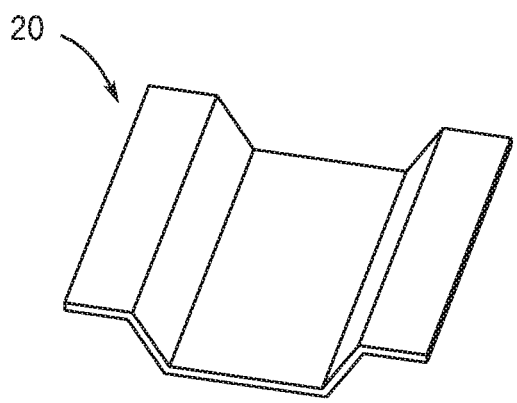
FIG. 5A is a schematic perspective view of the base layer with the shape of the outer contour of a trim component according to an exemplary embodiment.

As shown schematically in FIG. 5A, base layer 20 is formed to a three-dimensional shape which corresponds to form or shape (e.g. three-dimensional contour/outer contour) of the finished trim component.

Figure 5B:
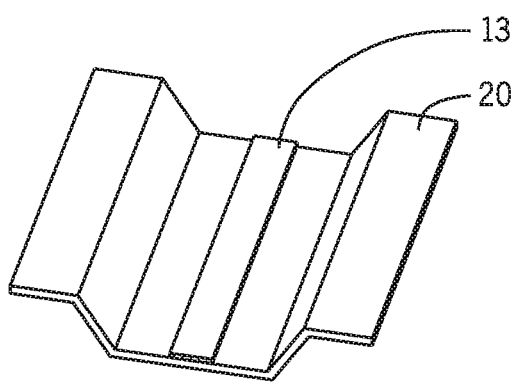
FIG. 5B is a schematic perspective view of the base layer with an adhesive layer applied to a selective area of the base layer according to an exemplary embodiment.

As shown schematically in FIG. 5B, an adhesive shown as adhesive tape or strip 13 is applied or placed on the surface (e.g. outer surface) of base layer 20. According to an exemplary embodiment, adhesive strip 13 is applied at the position of seam 15 from cover material 10.

Figure 5C:
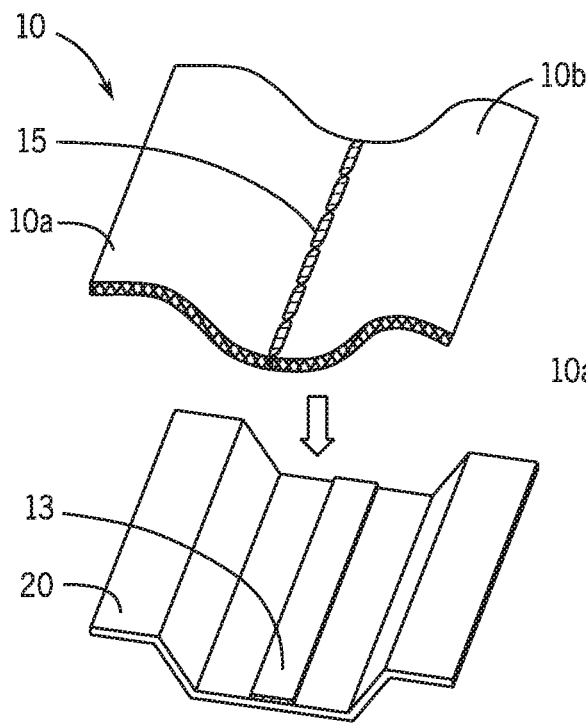
FIG. 5C is schematic perspective view of a cover material being applied to the base layer according to an exemplary embodiment.

As shown schematically in FIG. 5C, cover material 10 is attached (e.g. pre-fixed) to base layer 20 at adhesive strip 13.

Figure 5D:
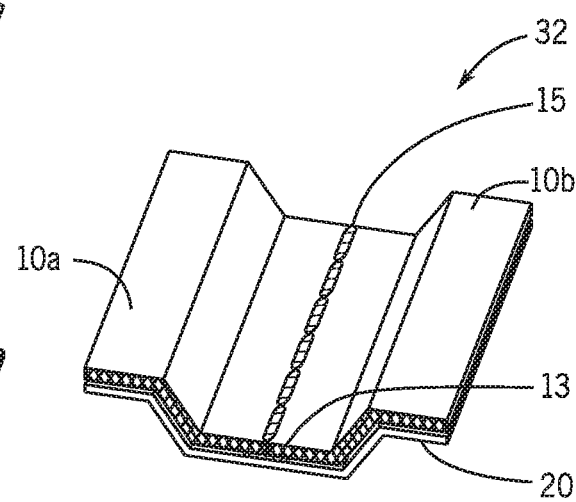
FIG. 5D is a schematic perspective view of a pre-laminate comprising the cover material and the base layer according to an exemplary embodiment.

As shown schematically in FIG. 5D according to an exemplary embodiment, a pre-laminate section or base/substrate shown as a pre-laminate 32 is formed; pre-laminate 32 comprises a combination of cover material 10 and base layer 20; cover material 10 is attached to base layer 20 by adhesive strip 13. According to an exemplary embodiment, cover material 10 is attached (e.g. lightly bonded, etc.) to base layer 20 by adhesive strip 13. According to an exemplary embodiment, cover material 10 can be detached from base layer 20 and re-attached to base layer 20 (e.g. if mis-applied).

Figure 5E:
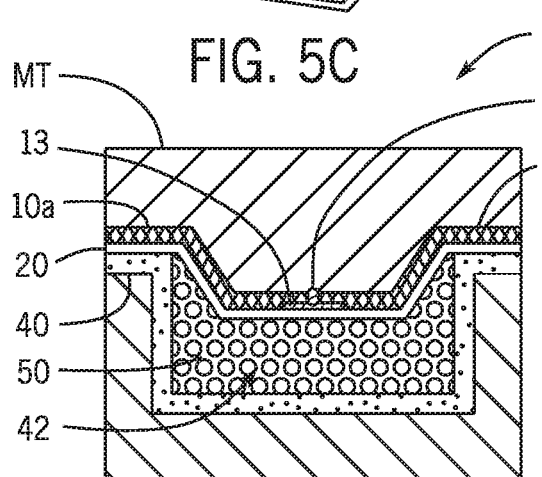
FIG. 5E is a schematic cross-section view of a foaming tool forming the trim component according to an exemplary embodiment.

As shown schematically in FIG. 5E, the apparatus or tool shown as mold M comprises mold top MT and mold bottom MB; mold M is in a closed position. Substrate 40 is placed in a recess of mold bottom MB; pre-laminate 32 is placed on top of substrate 40; a cavity shown as foaming chamber 42 is provided between base layer 20 and substrate 40. According to an exemplary embodiment, a foam material 50 is injected into foaming chamber 42 by an inlet/part such as a nozzle (e.g. flow channel on the side of the tool). According to an exemplary embodiment, mold M may provide a heat exchanger such as a heating element to control (e.g. increase) the temperature of mold M. According to an exemplary embodiment, foam material 50 may be created by introduction of materials that create a chemical reaction within mold M; the chemical reaction to form foam material 50 may be exothermic (e.g. generating heat). According to an exemplary embodiment, the temperature in mold M (e.g. from heating element in mold M and from the chemical reaction to foam material 50) will be configured to reach a temperature that corresponds to the activation temperature of adhesive 13; according to an exemplary embodiment, adhesive or adhesive strip 13 when activated at the activation temperature within mold M will bond cover material 10 to base layer 20. According to an exemplary embodiment, base layer 20 comprises a barrier layer impervious to foam material; base layer or barrier layer is intended to protect cover material 10 from damage by the foam material during the foaming process.

Figure 5F:
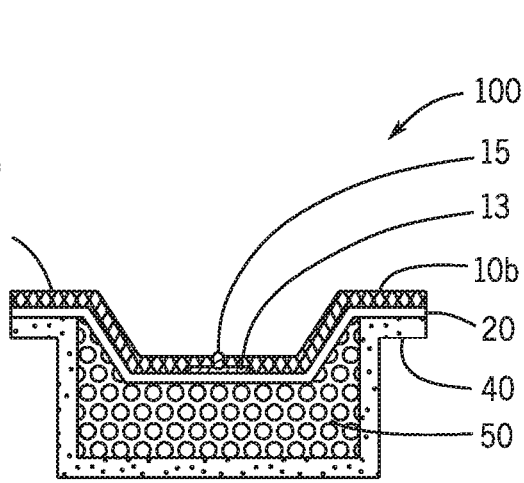
FIG. 5F is a schematic cross-section view of the trim component according to an exemplary embodiment.

According to an exemplary embodiment, trim component 100 is shown schematically in FIG. 5F; trim component 100 comprises cover material 10 bonded to base layer 20 by adhesive strip 13, substrate 40 and foam material 50.

Figure 6A:
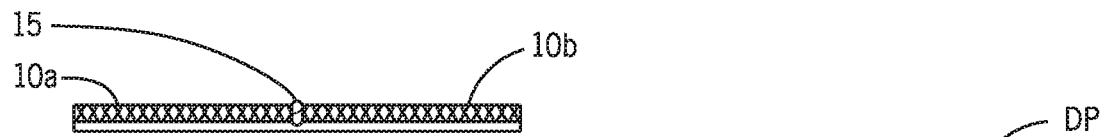
FIG. 6A is a schematic cross-section view of a cover material fixed to a base layer according to an exemplary embodiment.

As shown schematically in FIG. 6A, cover material 10 is joined to base layer 20u. According to an exemplary embodiment, base layer 20u provides an adhesive surface; base layer 20u lightly bonds (e.g. attached or pre-fixed to) with the reverse side of cover material 10 to form pre-laminate 34u.

Figure 6B:
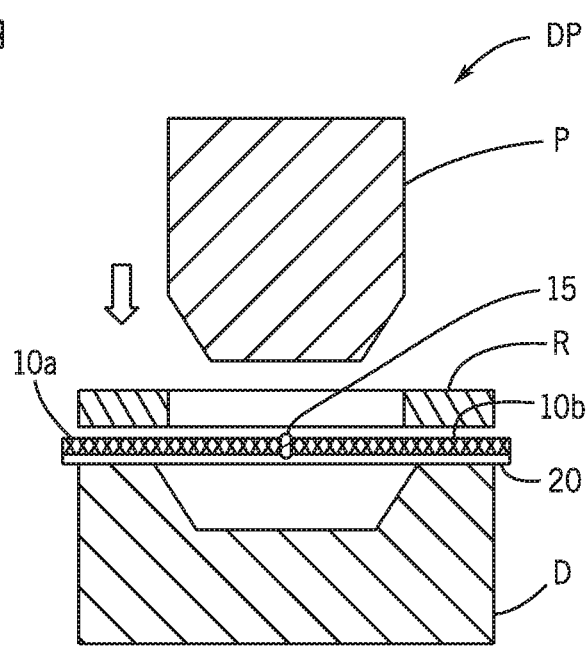
FIG. 6B is a schematic cross-section view of a tool forming a pre-laminate according to an exemplary embodiment.

As shown schematically in FIG. 6B according to an exemplary embodiment, an apparatus shown as a thermoforming machine DP comprises a punch P, a retainer R, and a die D. According to an exemplary embodiment, base layer 20u is heated within thermoforming machine DP to a melting temperature; when thermoforming machine DP is at a closed position, base layer 20u is shaped into the final shape of a finished trim component; base layer 20 bonds to cover material 10 to form pre-laminate 34.

Figure 6C:
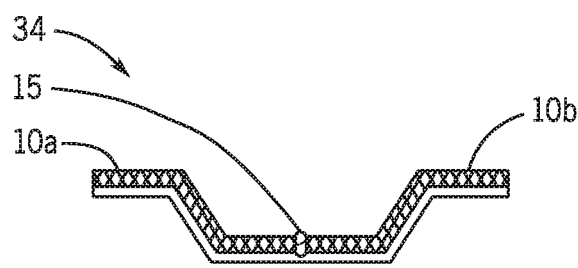
FIG. 6C is a schematic cross-section view of the pre-laminate according to an exemplary embodiment.
Figure 6D:
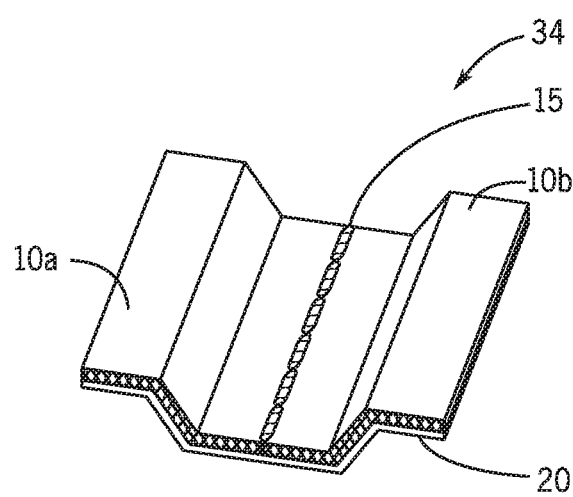
FIG. 6D is a schematic perspective view of the pre-laminate according to an exemplary embodiment.

As shown schematically in FIGS. 6C and 6D according to an exemplary embodiment, a pre-laminate section or base/substrate shown as pre-laminate 34 is formed; pre-laminate 34 corresponds to the outer contour of a finished trim component; pre-laminate 34 comprises a combination of cover material 10 bonded to base layer 20. According to an exemplary embodiment, pre-laminate 34 is placed in a mold to form the finished trim component in a subsequent step.

Figure 7A:
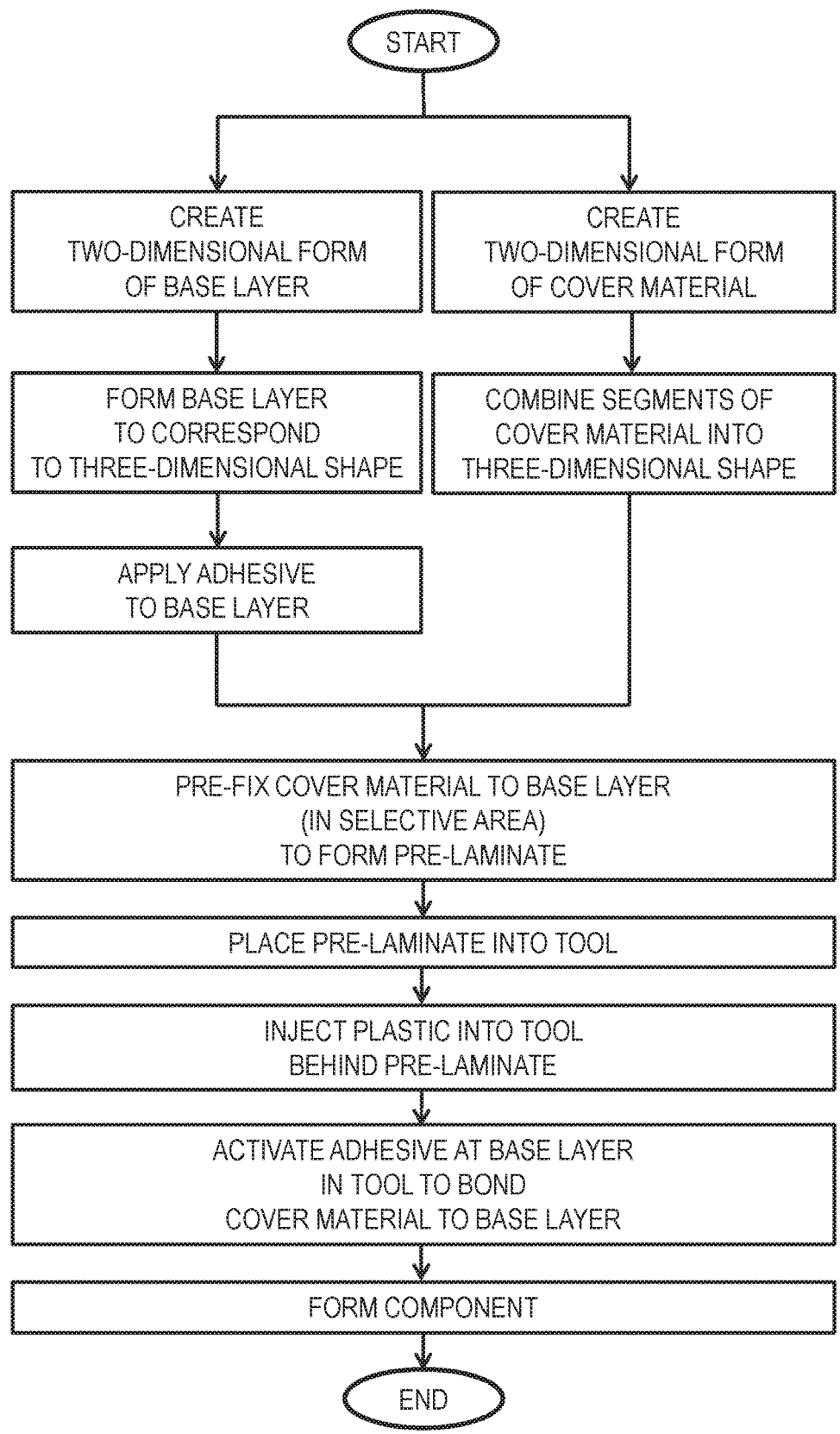
FIGS. 7A and 7B are schematic flow diagrams of methods for forming a trim component according to an exemplary embodiment.

As shown schematically in FIG. 7A according to an exemplary embodiment, a method for forming a trim component comprises the steps of: (1a) create two-dimensional form of base layer; (2a) form base layer to correspond to three-dimensional shape; (3a) apply adhesive to base layer; (1b) create two dimensional form of cover material; (2b) combine segments of cover material into three-dimensional shape; (4) pre-fix cover material to base layer (in selective area) to form three-dimensional pre-laminate; (5) place pre-laminate into tool; (6) inject plastic into tool behind pre-laminate; (7) activate adhesive at base layer in tool to bond cover material to base layer; (8) form component.

Figure 7B:
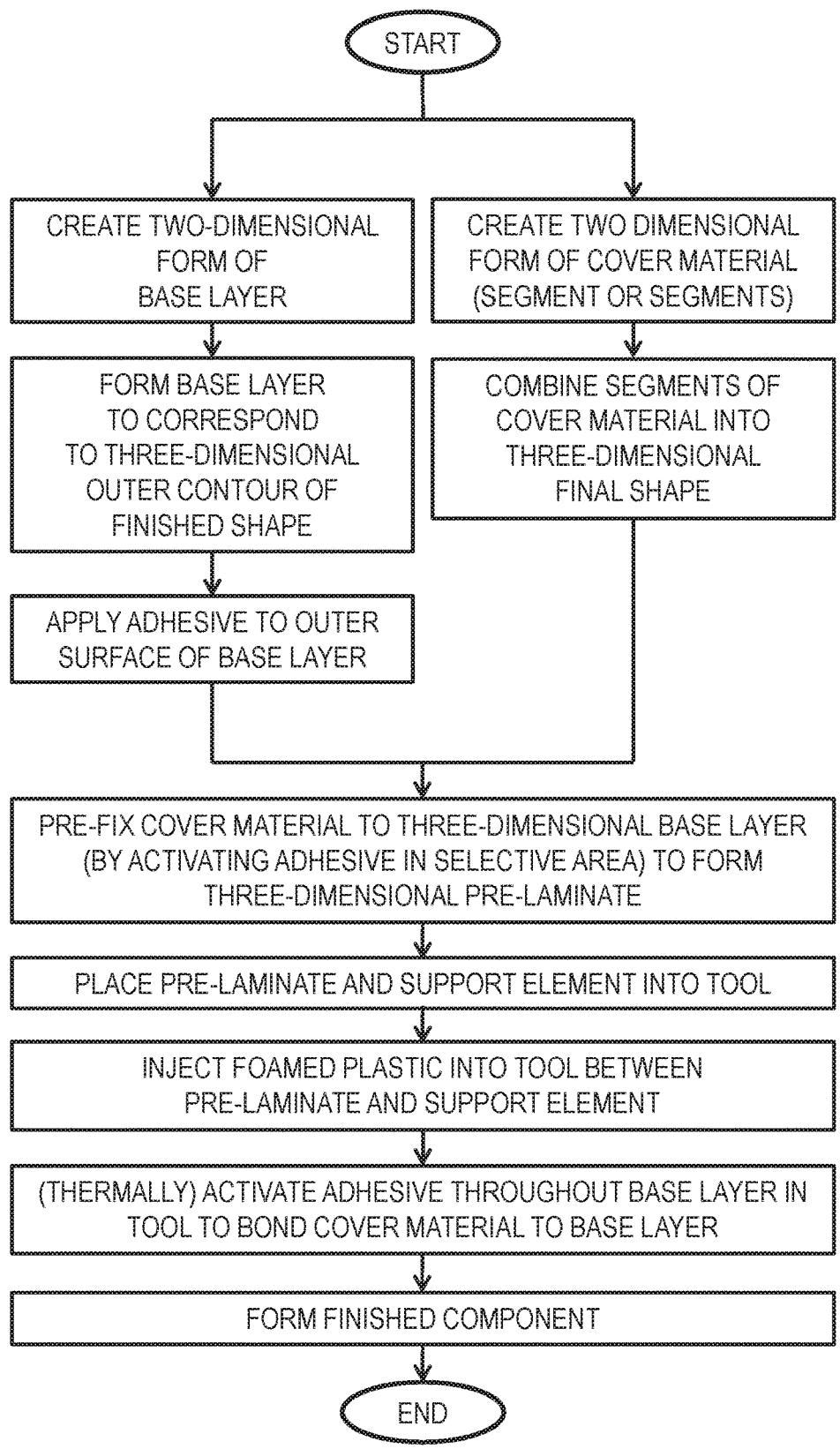

As shown schematically in FIG. 7B according to an exemplary embodiment, a method for forming a trim component comprises the steps of: (1a) create two-dimensional form of base layer; (2a) form base layer to correspond to three-dimensional outer contour of finished shape; (3a) apply adhesive to outer surface of base layer; (1b) create two dimensional form of cover material (segment or segments); (2b) combine segments of cover material into three-dimensional final shape; (4) pre-fix cover material to three-dimensional base layer (by activating adhesive in selective area) to form three-dimensional pre-laminate; (5) place pre-laminate and support element into tool; (6) inject foamed plastic into tool between pre-laminate and support element; (7) (thermally) activate adhesive throughout base layer in tool to bond cover material to base layer; (8) form finished component.

Figure 8A:
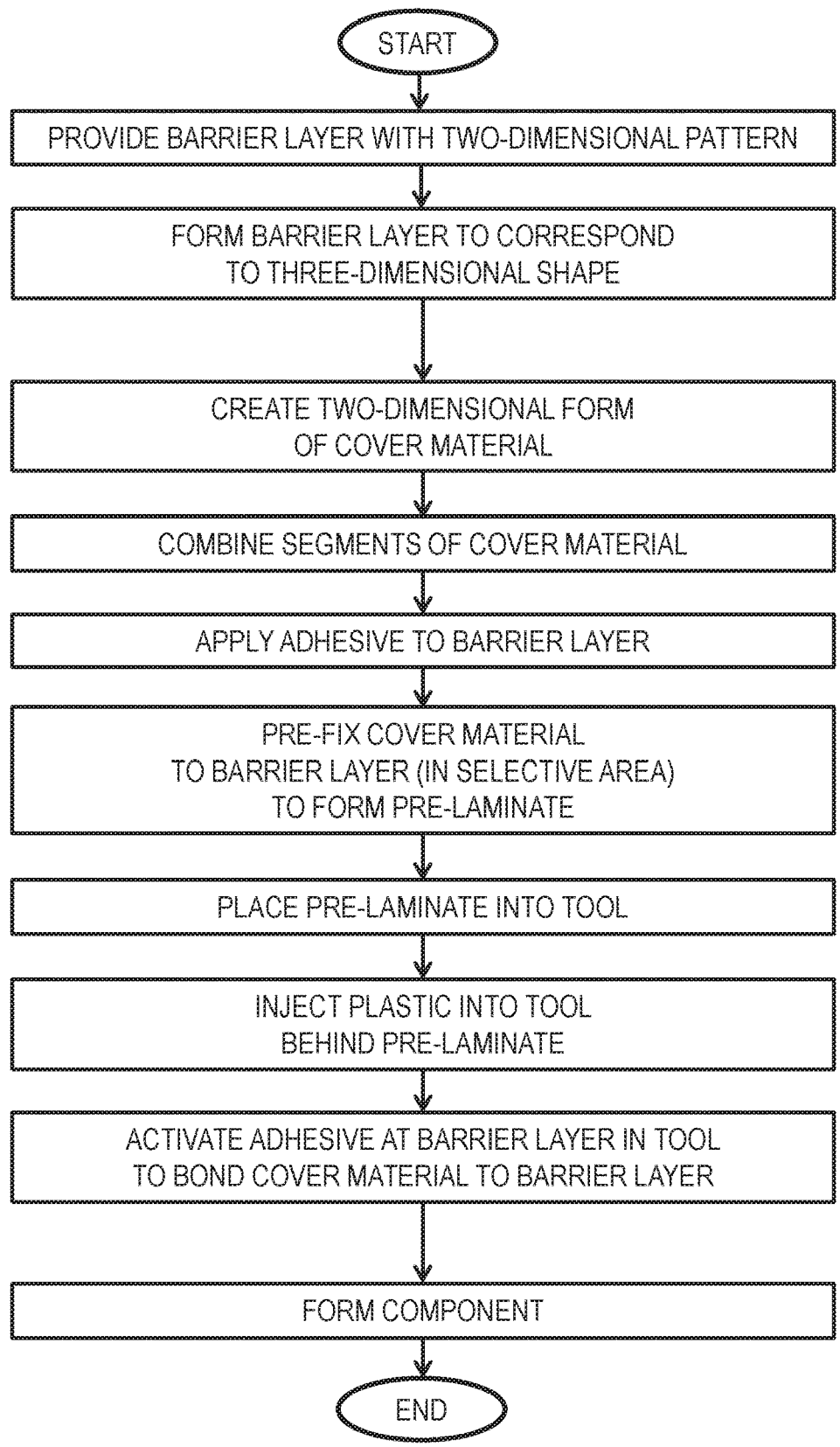
FIGS. 8A and 8B are schematic flow diagrams of methods for forming a trim component according to an exemplary embodiment.

As shown schematically in FIG. 8A according to an exemplary embodiment, a method for forming a trim component comprises the steps of: (1) provide barrier layer with two-dimensional pattern; (2) form barrier layer to correspond to three-dimensional shape; (3) create two dimensional form of cover material; (4) combine segments of cover material; (5) apply adhesive to barrier layer; (6) pre-fix cover material to barrier layer (in selective area) to form pre-laminate; (7) place pre-laminate into tool; (8) inject plastic into tool behind pre-laminate; (9) activate adhesive at barrier layer in tool to bond cover material to barrier layer; (10) form component.

Figure 8B:
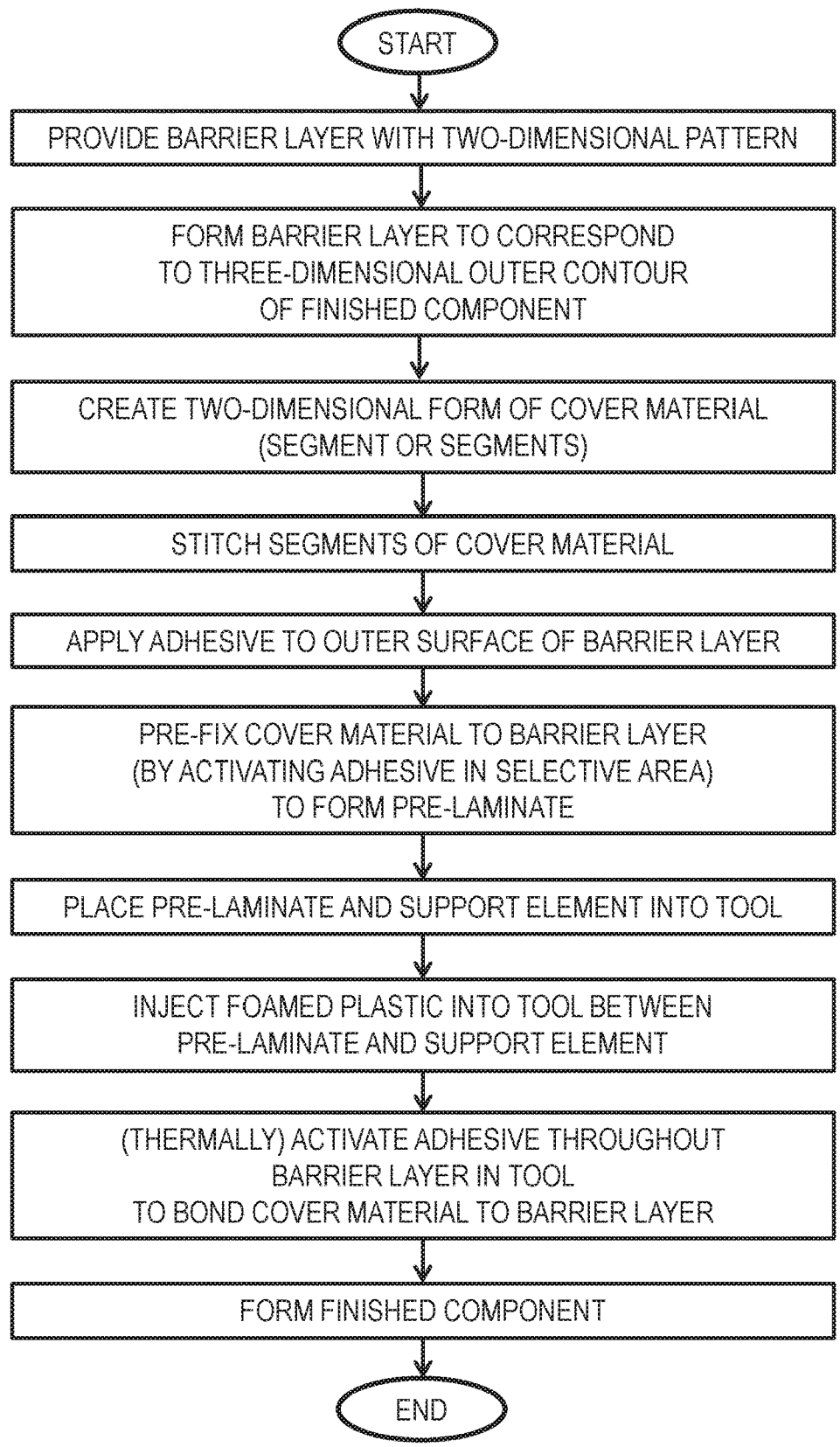

As shown schematically in FIG. 8B according to an exemplary embodiment, a method for forming a trim component comprises the steps of: (1) provide barrier layer with two-dimensional pattern; (2) form barrier layer to correspond to three-dimensional outer contour of finished component; (3) create two-dimensional form of cover material (segment or segments); (4) stitch segments of cover material; (5) apply adhesive to outer surface of barrier layer; (6) pre-fix cover material to barrier layer (by activating adhesive in selective area) to form pre-laminate; (7) place pre-laminate and support element into tool; (8) inject foamed plastic into tool between pre-laminate and support element; (9) (thermally) activate adhesive throughout barrier layer in tool to bond cover material to barrier layer; (10) form finished component.

Figure 9A:
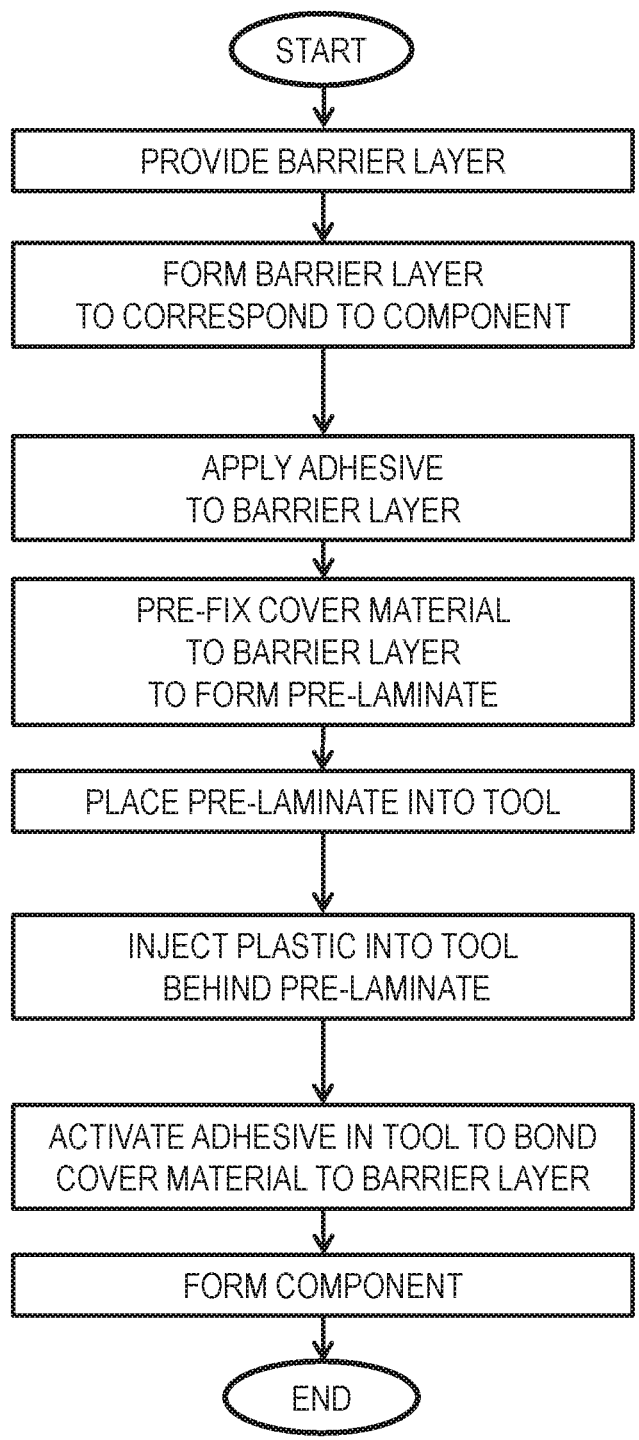
FIGS. 9A and 9B are schematic flow diagrams of methods for forming a trim component according to an exemplary embodiment.

As shown schematically in FIG. 9A according to an exemplary embodiment, a method for forming a trim component comprises the steps of: (1) provide barrier layer; (2) form barrier layer to correspond to component; (3) apply adhesive to barrier layer; (4) pre-fix cover material to barrier layer to form pre-laminate; (5) place pre-laminate into tool; (6) inject plastic into tool behind pre-laminate; (7) activate adhesive in tool to bond cover material to barrier layer; (8) form component.

Figure 9B:
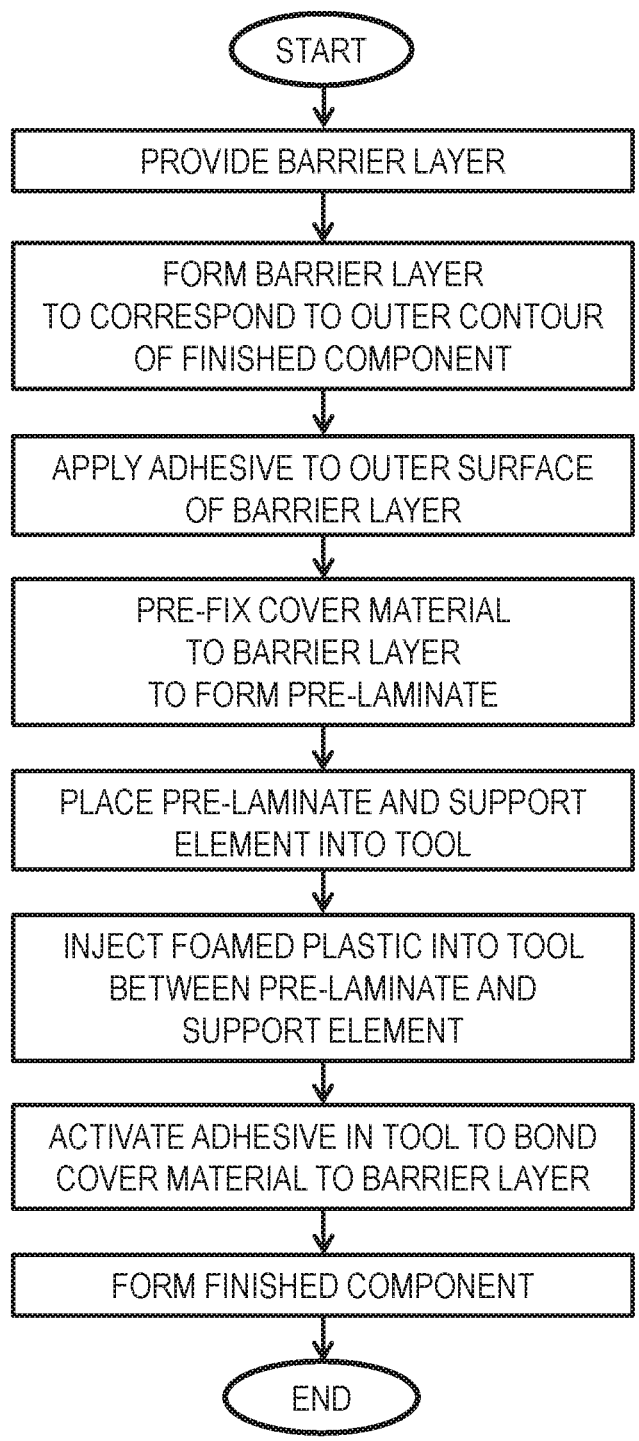

As shown schematically in FIG. 9B according to an exemplary embodiment, a method for forming a trim component comprises the steps of: (1) provide barrier layer; (2) form barrier layer to correspond to outer contour of finished component; (3) apply adhesive to outer surface of barrier layer; (4) pre-fix cover material to barrier layer to form pre-laminate; (5) place pre-laminate and support element into tool; (6) inject foamed plastic into tool between pre-laminate and support element; (7) activate adhesive in tool to bond cover material to barrier layer; (8) form finished component.

Figures 10A, 10B, 10C:
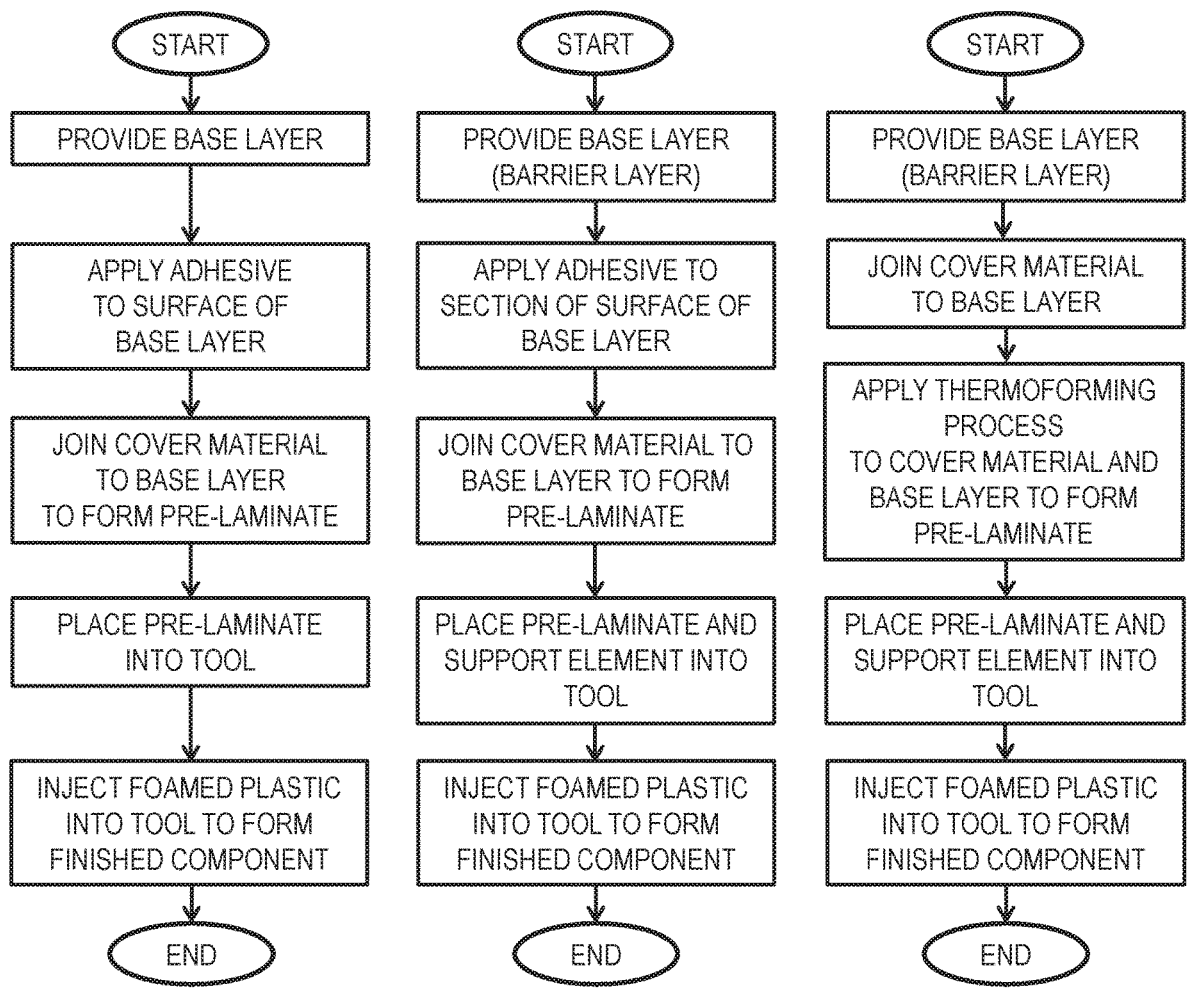
FIGS. 10A and 10C are schematic flow diagrams of methods for forming a trim component according to an exemplary embodiment.

As shown schematically in FIG. 10A according to an exemplary embodiment, a method for forming a trim component comprises the steps of: (1) provide barrier layer; (2) apply adhesive to surface of barrier layer; (3) join cover material to barrier layer to form pre-laminate; (4) place pre-laminate and support element into tool; (5) inject foamed plastic into tool to form finished component.

As shown schematically in FIG. 10B according to an exemplary embodiment, a method for forming a trim component comprises the steps of: (1) provide barrier layer; (2) apply adhesive to a section or sections of surface of barrier layer; (3) join cover material to barrier layer to form pre-laminate; (4) place pre-laminate and support element into tool; (5) inject foamed plastic into tool to form finished component.

As shown schematically in FIG. 10C according to an exemplary embodiment, a method for forming a trim component comprises the steps of: (1) provide barrier layer; (2) join cover material to barrier; (3) apply thermoforming process to barrier layer and cover material to form pre-laminate; (4) place pre-laminate and support element into tool; (5) inject foamed plastic into tool to form finished component.

Exemplary Embodiments

A method for producing multilayer molded bodies is shown and described according to an exemplary embodiment; a molded body may be produced by the method.

According to an exemplary embodiment, the visual appearance of the individual interior elements the feel and the interplay between material, form and color, etc. are components of quality for the vehicle interior. High-quality vehicle interiors are indicated by the manufactured material used. According to an exemplary embodiment, leather as a material (e.g. a natural material) presents challenges for use in a vehicle interior; processing of genuine to laminate plastic components with leather could be difficult (e.g. to position the seam and/or to join the leather material to the soft plastic subsurface while maintaining the leather appearance).

According to an exemplary embodiment, in-mold foaming behind a cover material within a mold facilitates joining a backing material and cover material (e.g. leather material) to form a trim component. According to an exemplary embodiment, in-mold foaming behind cover materials (such as leather) may cause seepage of the plastic materials through seams of the cover material (e.g. leather material); foaming techniques may result in defects or other generally undesired effects at the seam (e.g. a surface texture that resembles the skin of an orange). According to an exemplary embodiment, the seams may be misaligned relative to the plastic subsurface; cover material (e.g. leather material) may not adhere on the foamed plastic material. It is known that the various components of multilayer molded bodies are not dimensionally stable under various climatic conditions.

According to an exemplary embodiment, in-mold foaming methods may be highly labor-intensive; the methods require a plurality of process steps. According to an exemplary embodiment, the seams of the cover material need to be adequately sealed prior to the in-mold foaming; the foamed plastic is applied to the reverse side of the cover material; the foamed plastic may not penetrate through the seams when the foaming mold is closed and pressurized according to an exemplary embodiment. According to an exemplary embodiment, when the foamed plastic penetrates through the seams, the cover material can be damaged or the feel/appearance of the cover material may be impaired.

According to an exemplary embodiment, an adhesive tape can be attached to the reverse side of the cover material to seal and protect the seams. According to an exemplary embodiment, an adhesive tape may be unable to provide adequate sealing for the seams on the cover material.

According to an exemplary embodiment, the seam of the cover material may be insufficiently fixed and slips during the in-mold foaming process. According to an exemplary embodiment, the polyurethane barrier layer can lead to a change in the properties of the cover material.

According to an exemplary embodiment, a method for producing multilayer molded bodies may comprise the cover material stabilized within the foaming mold to prevent slipping during in-mold foaming; the method may provide for reliably sealing the reverse/back side of the cover material. See FIGS. 4E, 5B and 6C.

According to an exemplary embodiment, a method for producing multilayer molded bodies may comprise a foamed plastic applied to the reverse side of a cover material. According to an exemplary embodiment, the "reverse side" (also called the flesh side) is the side of the cover material which is not visible to vehicle occupants viewing the molded body. See FIGS. 4G and 5E.

According to an exemplary embodiment, a base layer (such as a barrier layer, film, self-supporting barrier layer) is impervious to the foamed plastic; self-supporting barrier layer is first produced; at least part of the reverse side of the cover material is applied and fixed to the self-supporting barrier layer to form a pre-laminate between the barrier layer and the cover material. The pre-laminate is introduced into a foaming mold with the barrier layer between the cover material and a foam chamber of the foaming mold. The foamed plastic is introduced into the foam chamber of the foaming mold for the in-mold foaming of the cover material covered by the self-supporting barrier layer. See FIGS. 4G and 5E.

According to an exemplary embodiment, the cover material is already joined to a self-supporting barrier layer to produce a pre-laminate prior to being introduced into the foaming mold; slipping of the cover material may be effectively prevented. See FIGS. 6C and 6D.

According to an exemplary embodiment, different areas of the cover material may be positioned on the self-supporting barrier layer by affixing the cover material to a self-supporting barrier layer prior to insertion into the foaming mold to effectively prevent slippage of the cover material; the self-supporting barrier layer covers the reverse side of the cover material to prevent damage to the cover material during in-mold foaming. See FIGS. 4E, 5D and 6C.

According to an exemplary embodiment, the barrier layer is produced to substantially correspond to the outer contour of the molded body to be manufactured. According to an exemplary embodiment, material warping and/or over-lapping may occur during the positioning of the cover material in corner areas of a molded body, mainly complex three-dimensional molded bodies (e.g. instrument panels, etc.). According to an exemplary embodiment, by preforming the self-supporting barrier layer, the cover material can be precisely fixed to the self-supporting barrier layer to correspond to the outer contour of the molded body prior to being inserted into the foaming mold. According to an exemplary embodiment, prior to insertion into the foaming mold, the self-supporting barrier layer corresponds to the outer contour of the molded body to be produced; the cover material can be positioned and fixed onto the self-supporting barrier layer with the highest precision. According to an exemplary embodiment, the barrier layer may be formed as a planar structure; at least part of the reverse side of the cover material is fixed to the barrier layer; deformation of the pre-laminate of the barrier layer and cover material occurs in a subsequent process step; the pre-laminate precisely adapts to the outer contour of what will be the molded body. See FIGS. 6A to 6D.

According to an exemplary embodiment, the base layer or barrier layer formed from a thermally thermoformed film may have higher rigidity at relatively low weight. According to an exemplary embodiment, different thicknesses and densities to the thermoformed film can be used. According to an exemplary embodiment, the barrier layer can be formed from polyolefin or polystyrene; using polystyrene films is advantageous when the feel of the molded body surface (the indentation hardness) should be relatively hard. According to an exemplary embodiment, using polystyrene achieves a high dimensional stability to the self-supporting barrier layer. According to an exemplary embodiment, utilizing barrier layers of polyolefin thermoformed films is advantageous when producing more flexible molded bodies. According to an exemplary embodiment, polypropylene, polyethylene and/or polyethylene terephthalate are suitable materials to form barrier layers. According to an exemplary embodiment, it would be advantageous for the self-supporting barrier layer to be produced from a foamed polypropylene thermoformed film due to the high thermal stability as well as the good cost/performance ratio.

According to an exemplary embodiment, the barrier layer can be of self-adhesive design; it is not necessary to apply a separate layer of adhesive onto the barrier layer in a further method step to fix the cover material onto the barrier layer. The barrier layer is self-adhesive that the cover material can be directly joined to the barrier layer during a thermoforming process. The cover material can be joined to the barrier layer while being brought into the desired three-dimensional form (e.g. outer contour of the molded body to be produced) in a thermoforming process. According to an exemplary embodiment, the barrier layer may be made of a thermally activated thermoplastic; the thermoplastic obtains the adhesive strength from the heat introduced during the thermoforming. According to an exemplary embodiment, it would be advantageous to apply and to position the cover material on the barrier layer prior to thermoforming; the barrier layer does not yet have any adhesive properties prior to thermoforming. The barrier layer obtains adhesive strength and subsequently bond with the cover material into a pre-laminate when heat is introduced by the thermoforming process. According to an exemplary embodiment, the barrier layer may be self-adhesive; the barrier layer may have adhesive strength prior to the thermoforming process; a pre-laminate is formed between the barrier layer and the cover material prior to the thermoforming.

According to an exemplary embodiment, the fixation between the barrier layer and the cover material can also be realized by means of at least one separate adhesive layer. The adhesive layer is applied to the self-supporting barrier layer. The adhesive layer can either be applied onto the barrier layer directly prior to the pre-laminate being produced or be disposed on the surface of the self-supporting barrier layer right from the very beginning. The adhesive layer is applied to at least areas of the self-supporting barrier layer. According to an exemplary embodiment, the adhesive layer may be provided on at least parts of the self-supporting barrier layer where the seams of the cover material are to be placed. According to an exemplary embodiment, an adhesive layer may be provided over the entire surface of the self-supporting barrier layer. See FIGS. 4B, 4C, 4D, 5B and 5C.

According to an exemplary embodiment, the adhesive layer slightly bonds between the self-supporting barrier layer and the cover material; the cover material can be separated from the self-supporting barrier layer before the pre-laminate is foam-backed in the foaming mold. According to an exemplary embodiment, the adhesive layer can be activated above a predefined activation temperature; the activation temperature of the adhesive layer is below the melting temperature of the self-supporting barrier layer; the activation temperature is also in a range which corresponds to a reaction temperature of the foamed plastic. According to an exemplary embodiment, the activation temperature is between 40 degrees Celsius and 60 degrees Celsius (approximately 50 degrees Celsius) which corresponds to the temperature range reached when the foamed plastic is foamed in the foaming mold. According to an exemplary embodiment, the applied adhesive layer liquefies at the processing temperature of the supplied foamed plastic. A final bond is obtained between the self-supporting barrier layer and the cover material; due to the increase in volume of the foamed plastic and the foam pressure within the foam chamber of the foaming mold, a force is exerted on the barrier layer such that the self-supporting barrier layer is pressed onto the reverse side of the cover material. See FIGS. 4G and 5E.

According to an exemplary embodiment, the cover material can comprise at least one joining and/or decorative seam (e.g. when leather materials are used as the cover material); the cover material can be fixed to the barrier layer along the joining/decorative seam (e.g. complexity can be reduced, the amount of adhesive can be reduced, etc.); the cover material may be affixed to the base or barrier layer solely along the joining/decorative seam (or in another manner). See FIGS. 5B, 5C and 5D.

According to an exemplary embodiment, commonly known types of leather able to be tanned, dyed, coated, impregnated (leather with the addition of materials such as grease, wax, impregnating resins, etc., may be improved in properties without losing typical leather characteristics) or otherwise treated by means of standard procedures can be used as the cover material. Conventional cowhide, sheepskin, goatskin, pigskin, ostrich or crocodile leather are applicable as the cover material; cowhide is used according to an exemplary embodiment as the preferred method. The leather can be used for covering molded bodies in automotive manufacturing (e.g. seat cushions, backrests, armrests, door trim panels or instrument panels, etc.). Leathers tanned using metal salt (e.g. chrome, aluminum) and leathers free of metal salts can be used.

According to an exemplary embodiment, the joining/decorative seam can be positioned on the barrier layer by using at least one seam blade and/or optical sensors.

According to an exemplary embodiment, a method for laminating a component with the cover material is provided. The barrier layer is formed in a first method step; the cover material is at least partially materially bonded to the formed barrier layer in a second method step; the barrier layer joined to the cover material is in-mold foamed in a third method step. See FIGS. 4A to 4G and 5A to 5E.

According to an exemplary embodiment, the material bonding of the barrier layer to the cover material is intended to prevent slipping. During the subsequent in-mold foaming, the barrier layer provides a seal and prevents foam from seeping through (i.e. at the seams of the cover material). According to an exemplary embodiment, the barrier layer may be bonded to the cover material; the foam provided for the in-mold foaming can be introduced at high pressure eliminating the step of subsequently compressing the cover material and foamed base body. See FIGS. 4G and 5E.

According to an exemplary embodiment, the cover material is preferably a leather and/or imitation leather cover material for laminating an interior component of a motor vehicle part (e.g. an instrument panel, etc.). The laminated component forms an imitation or genuine leather instrument panel. The barrier layer is partially and/or fully bonded to the cover material. See FIGS. 3A, 3B, 4H and 5F.

According to an exemplary embodiment, the third method step is disposing the barrier layer joined to the cover material in a foaming mold. According to an exemplary embodiment, the process of laminating the component can be integrated into an industrial manufacturing process which is part of a production line. Since the barrier layer is fixed to the cover material the chance of barrier layer slippage during the automated processing and handling of the laminated component can be reduced/eliminated. See FIGS. 4D, 4F, 4G, 5C, 5D, and 5E.

According to an exemplary embodiment, the formed barrier layer may be at least partly joined to the cover material along a seam of the cover material or in the direct proximity of the seam in the second method step. According to an exemplary embodiment, limiting the material bond of the barrier layer and the cover material to the areas relevant to the in-mold foaming may be sufficient; the material bonding expense can be reduced to a minimum without limiting the functionality of the fixed barrier layer. According to an exemplary embodiment, greater manufacturing tolerances are permissible during the forming of the barrier layer in the first method step.

According to an exemplary embodiment, the barrier layer may be heated and thermoformed in the first method step; the barrier layer is adapted to the form of the component in the first method step; the adapted deformation to the component is intended ensure that the barrier layer does not contribute to the formation of the laminated component during the in-mold foaming. According to an exemplary embodiment, the base layer or barrier layer is intended to act as a barrier between foam and the cover material. According to an exemplary embodiment, it would be advantageous to provide a safeguard; the cover material may be removed from the foamed base at a later point in time (e.g. for recycling). See FIGS. 3A, 3B, 4H and 5F.

According to an exemplary embodiment, optical aids or blades/swords may be used to position and/or fix the cover material on the barrier layer at least along one seam of the cover material prior to the second method step; the molded barrier layer may can be positioned relative to the cover material (e.g. the seam) to improve process reliability.

According to an exemplary embodiment, the cover material and the barrier layer may be bonded together by an adhesive and/or joined together by fusion in the second method step. According to an exemplary embodiment, fusing allows the cover material and the barrier layer to be joined together without additional adhesives. According to an exemplary embodiment, the adhesives are preferably applied to the barrier layer and/or cover material at points or by areas on one side prior to the second method step. See FIGS. 4C, 5B, 6A and 6B.

According to an exemplary embodiment, the barrier layer may be foam-backed with flexible polyurethane (PUR) foam in the third method step. See FIGS. 4G and 5E.

According to an exemplary embodiment, a foam barrier layer and/or a hard barrier layer may be used as the barrier layer. The selection of materials for the barrier layer contributes to defining the surface properties of the laminated component. According to an exemplary embodiment, a foam barrier layer ensures a softer surface quality to the laminated component; a compact hard barrier layer ensures a harder surface quality when a compact hard barrier layer is disposed beneath the cover material. According to an exemplary embodiment, a barrier layer may comprise a plurality of different sub-barrier layers; the surface of the laminated component may vary across various compositions; the laminated components may be adapted to more unusual conceptions.

According to an exemplary embodiment, the adhesive is activated and reacts in the third method step by heating the foaming mold and/or by a reaction temperature of the flexible polyurethane (PUR) foam; material bonding between the cover material and the barrier layer can be realized at the same time as in-mold foaming to save time. See FIGS. 4G and 5E.

The present invention also relates to a mold for laminating. According to an exemplary embodiment, the mold can be integrated into a production line for manufacturing interior components for motor vehicles; the mold can increase reliability in component lamination.

As shown schematically in FIG. 4B, a self-supporting barrier layer 20 is produced; according to an exemplary embodiment, barrier layer 20 is impervious to foamed plastics (e.g. polyurethane (PUR) foam, etc.). According to an exemplary embodiment, barrier layer 20 can be formed from a foamed polyolefin or polystyrene film. As shown schematically in FIG. 4B, the self-supporting barrier layer 20 exhibits a specific form which corresponds to the outer contour of the molded body to be produced. According to an exemplary embodiment, the molded body can be the outer contour of an instrument panel, a door trim panel, a center console or other interior trim component for motor vehicles. According to an exemplary embodiment, the self-supporting barrier layer is preformed prior to being introduced into the foaming mold.

According to an exemplary embodiment, the barrier layer is pre-formed by thermoforming of polyolefin or polystyrene film. As shown schematically in FIG. 4A, barrier layer 20 is formed with a recess.

As shown schematically in FIG. 4C, an adhesive layer 12 is applied to the surface of the self-supporting barrier layer 20. Adhesive layer 12 is applied to the outer side of barrier layer 20 joined to the cover material (in the subsequent step). According to an exemplary embodiment, the foamed film for producing the barrier layer may comprise an adhesive layer when being produced; the barrier layer can be joined to the cover material (e.g. after thermoforming of the barrier layer).

As shown schematically in FIG. 4D, a cover material 10 may be made of genuine or imitation leather. As shown schematically in FIG. 4D, cover material 10 consists of two separate parts (part 10a and part 10b) connected together via a seam 15. According to an exemplary embodiment, the cover material may not comprise any seam; the cover material may comprise a plurality of joining and/or decorative seams.

As shown schematically in FIG. 4F, the reverse side of cover material 10 is placed onto self-supporting barrier layer 20 and fixed to barrier layer 20 by means of adhesive layer 12. According to an exemplary embodiment, cover material 10 is bonded to self-supporting barrier layer 20 along at least part of the reverse side of cover material 10 to form a pre-laminate 30. As shown schematically in FIG. 4F, pre-laminate 20 comprises barrier layer 20 and cover material 10 and adhesive layer 12 bonding barrier layer 20 and cover material 10 together. Cover material 10 corresponds to the outer contour of the multilayer molded body to be produced prior to being introduced into a foaming mold. See also FIG. 4G.

According to an exemplary embodiment, adhesive layer 12 can be a thermally activated adhesive such as a thermosetting resin; the thermosetting resin initially slightly bonds self-supporting barrier layer 20 and cover material 10 together. According to an exemplary embodiment, the final bonding of barrier layer 20 and cover material 10 is achieved during the in-mold foaming within the foaming mold; according to an exemplary embodiment, the temperature for in-mold foaming corresponds to the processing temperature of adhesive layer 12.

As shown schematically in FIG. 4G, pre-laminate 30 is set into a foaming mold M. As shown schematically in FIG. 4G, foaming mold M comprises a mold top MT and a mold bottom MB; pre-laminate 30 is fixed between mold top MT and mold bottom MB; a support element 40 is placed between barrier layer 20 and mold bottom MB. As shown schematically in FIG. 4G, a foam chamber 42 is formed between pre-laminate 30 and support element 40; foam chamber 42 is filled with foamed plastic 50 (e.g. polyurethane (PUR) foam, etc.) by a side filling channel. According to an exemplary embodiment, the foamed plastic can be a CO2 driven molded polyurethane foam; the foamed plastic produces a pressure when foaming within the foam chamber 42; the pressure presses pre-laminate 30 against mold top MT of foaming mold M. According to an exemplary embodiment, the polyurethane (PUR) foam reaches a temperature (when foaming in the foam chamber 42) which corresponds to the activation temperature of adhesive layer 12; the pressure and the temperature from foamed plastic 50 creates a final bond between barrier layer 20 and cover material 10.

According to an exemplary embodiment, barrier layer 20 is impervious to foamed plastic 50; foamed plastic 50 is prevented from penetrating into the pores of cover material 10 or diffusing through seam 15. According to an exemplary embodiment, after foamed plastic 50 cools and cures (e.g. solidifies, hardens, etc.) pre-laminate 30 (i.e. cover material 10 and barrier layer 20) permanently joins to support element 40 to form a multilayer molded body (e.g. an instrument panel).

According to an exemplary embodiment, pre-laminate 30 is produced prior to being introduced into foaming mold M; pre-laminate 30 is intended to prevent cover material 10 from slipping during the in-mold foaming to avoid unevenness on the surface of the multilayer molded body.

As shown schematically in FIGS. 5A to 5F, cover material 10 is joined to self-supporting barrier layer 20 along seam 15. As shown schematically in FIG. 5B to 5F, adhesive layer 13 is applied to areas of barrier layer 20 at which seam 15 of cover material 10 are to be fixed. As shown schematically in FIGS. 5A to 5F, one seam 15 is provided on cover material 10. According to an exemplary embodiment, a plurality of joining and/or decorative seams may be joined to the barrier layer by adhesive strips.

As shown schematically in FIGS. 6A to 6D, the barrier may comprise or have applied a self-adhesive. According to an exemplary embodiment, the step of applying a separate adhesive layer on the surface of the barrier layer can be omitted.

According to an exemplary embodiment, barrier layer 20 may be self-adhesive; cover material 10 can be joined to barrier layer 10 during a thermoforming process. As shown schematically in FIG. 6B, cover material 10 is positioned on the surface of a barrier layer 20u and joined to the self-adhesive barrier layer 20u by means of a thermoforming mold DP. According to an exemplary embodiment, barrier layer 20u is formed from a self-adhesive thermoplastic (e.g. polypropylene, etc.). As shown schematically in FIG. 6B, barrier layer 20u and cover material 10 are fixed within a thermoforming mold DP between a retainer R (e.g. spring-loaded clamping element) and a lower part shown as a die D. According to an exemplary embodiment, at least barrier layer 20u is heated until the adhesive effect develops. According to an exemplary embodiment, a tool or die element shown as a punch/press P presses barrier layer 20u and cover material 10 into an indentation in die D, the outer contour of barrier layer 20 is formed and a permanent bond is created between barrier layer 20 and cover material 10.

As shown schematically in FIGS. 6C and 6D, pre-laminate 34 is created from barrier layer 20 and cover material 10. According to an exemplary embodiment, pre-laminate 34 is equivalently to pre-laminates formed with adhesive layer; pre-laminate 34 is introduced into a foaming mold and joined to a multilayer molded body in the subsequent method steps.

It is important to note that the construction and arrangement of the elements of the inventive concepts and inventions as described in this application and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, operating conditions and arrangement of the preferred and other exemplary embodiments without departing from the spirit of the present inventions.

It is important to note that the apparatus of the present inventions can comprise conventional technology (e.g. as implemented in present configuration) or any other applicable technology (present or future) that has the capability to perform the functions and processes/operations indicated in the FIGURES. All such technology is considered to be within the scope of the present inventions and application.

The invention claimed is:

1. A method for producing a trim component for a vehicle interior as a formed component, the method comprising the steps of:
   (a) providing a single-layer self-supporting barrier comprising a barrier layer;
   (b) forming the barrier into a shape;
   (c) forming a cover material having a perimeter and a central region onto the barrier in substantially the shape of the barrier to form a pre-laminate substantially having the shape with the barrier supporting the cover material throughout the central region of the cover material;
   (d) placing a substrate and the pre-laminate of the cover material and the barrier into a tool;
   (e) introducing foam material into the tool against the pre-laminate on a side of the barrier opposite to the cover material;
   (f) forming the formed component in the tool so that the formed component comprises the cover material and the barrier substantially retaining the shape, and with a backing of the foam material between the barrier and the substrate; and
   (g) removing the formed component from the tool;
   wherein the cover material is fixed to the barrier;
   wherein the barrier is substantially impermeable to the foam material so as to seal a back side of the cover material from the foam material; and
   wherein the trim component comprises a finished shape substantially corresponding to the shape substantially retained by the cover material and the barrier.

2. The method of claim 1 wherein the barrier comprises at least one of a foil or a film.

3. The method of claim 1 wherein the cover material comprises at least one of leather or imitation leather.

4. The method of claim 1 wherein the barrier is configured to seal the cover material from the foam material at a seam of the cover material.

5. The method of claim 1 wherein the barrier comprises polyolefin or polystyrene.

6. A method for producing a trim component for a vehicle interior, the trim component comprising a formed component, and the method comprising the steps of:
   (a) providing a single-layer self-supporting barrier in a shape, the barrier comprising a barrier layer;

(b) forming a cover material having a perimeter and a central region onto the barrier in substantially the shape of the barrier to form a pre-laminate substantially having the shape with the barrier supporting the cover material throughout the central region of the cover material; and (c) forming the formed component to comprise a substrate, the cover material, the barrier, and foamed plastic material by introducing foamed plastic material in a tool against the pre-laminate on a side of the barrier opposite the cover material, the cover material and the barrier substantially retaining the shape as an outer contour of the trim component, with a backing of the foamed plastic material arranged between the barrier and the substrate;

wherein the cover material comprises at least one of a leather material and/or an imitation leather material;

wherein the cover material is fixed to the barrier; and wherein the barrier is substantially impermeable to the foamed plastic material so as to seal a back side of the cover material from the foamed plastic material.

7. The method of claim 6 wherein the barrier comprises at least one of a foil or a film.

8. The method of claim 6 wherein the barrier is impervious to the foamed plastic material.

9. The method of claim 6 wherein the step of forming the cover material onto the barrier in substantially the shape of the barrier comprises adhering the cover material to the barrier.

10. The method of claim 6 wherein the step of forming the cover material onto the barrier in substantially the shape of the barrier comprises providing a bond to prevent slipping of the cover material on the barrier.

11. The method of claim 6 wherein the step of forming the cover material onto the barrier in substantially the shape of the barrier provides protection for the cover material from damage by the foamed plastic material during the step of forming the formed component.

12. The method of claim 6 wherein the step of forming the formed component comprises injection molding the foamed plastic material in the tool; and wherein the barrier is provided to protect the cover material during injection molding of the foamed plastic material.

13. The method of claim 6 wherein the foamed plastic material comprises a flexible polyurethane foam material.

14. The method of claim 6 wherein the foamed plastic material forms a backing of the formed component.

15. The method of claim 6 wherein the cover material comprises segments of at least one of the leather material and/or the imitation leather material; and wherein the method further comprises the step of joining the segments of the cover material at a seam before forming the cover material onto the barrier layer.

16. A method for producing a trim component for a vehicle interior as a formed component comprising a cover comprising segments and a seam in a tool, the method comprising the steps of:

(a) providing a barrier layer in a shape;

(b) forming the cover onto the barrier layer in substantially the shape of the barrier layer to form a pre-laminate substantially having the shape;

(c) placing a substrate and the pre-laminate of the cover and the barrier layer into the tool; and (d) forming the formed component in the tool by introducing a foamed plastic material into the tool against the pre-laminate on a side of the barrier layer opposite the seam of the cover so that the barrier layer forms a barrier between the foamed plastic material and the seam of the cover;

wherein the formed component comprises the cover and the barrier layer substantially retaining the shape as an outer contour of the trim component, and with the foamed plastic material between the barrier layer and the substrate;

wherein the segments of the cover comprise segments of at least one of leather or imitation leather;

wherein the cover is fixed to the barrier layer along the seam of the cover; and wherein the barrier layer is impervious to the foamed plastic material so as to seal the seam from the foamed plastic material.

17. The method of claim 16 wherein the formed component has the shape of the barrier layer.

18. The method of claim 16 further comprising the step of joining the segments of the cover together at the seam.

19. The method of claim 16 further comprising the step of thermoforming a film to form the barrier layer.

20. The method of claim 16 further comprising the step of forming the barrier layer from polypropylene.

\* \* \* \* \*